United States Patent Office 3,153,127
Patented Oct. 13, 1964

3,153,127
CIRCUIT INTERRUPTER HAVING A RAPIDLY
VAPORIZABLE COIL ACROSS A SPARK GAP
Norman K. Osmundsen and Philip W. Bogner, Bloomington, Ind., assignors to Westinghouse Electric Corporation, East Pittsburgh, Pa., a corporation of Pennsylvania
Filed July 6, 1960, Ser. No. 41,081
11 Claims. (Cl. 200—115)

This invention relates to circuit interrupters, and while it is not necessarily limited thereto, it is particularly adaptable to circuit interrupters for disconnecting the ground lead of a lightning arrester which may have failed in service.

Lightning arresters of the valve type usually consist of one or more spark gaps which isolate the arrester from the line under normal conditions, but which break down and permit the passage of surge currents when a high surge voltage occurs, and one or more blocks of resistance material having valve characteristics, that is, which are substantially non-conducting under normal voltage, but which become capable of carrying large surge currents when a sufficiently high voltage is applied across them. These elements are assembled in series relation in a porcelain casing, a sufficient number of gaps and blocks being used to obtain the desired voltage rating. Such a device is designed to be connected between a power line and ground. When the gap sparks over in response to abnormal voltage, current flows from the line, through the gap assembly and thence through the valve material to ground. The valve material has a high resistance at normal line to ground voltage so that the flow of power follow current after a surge has been discharged is limited in magnitude. This current is then completely interrupted in the series gap at the first current zero thus promptly restoring the ordinarily non-conductive ground path to normal. Occasionally, lightning arresters become damaged and unable to interrupt the flow of power follow current to ground. If the lightning arrester is unable to revert to its insulating condition after being discharged by a surge, it puts a ground on the system and causes the operation of circuit breakers unless the lightning arrester is cleared from the circuit. If the arrester stays on the system, in its non-insulating condition, it becomes impossible to reclose the breakers, and hence the line is locked out of service until the failed lightning arrester has been found and removed by hand.

To combat this possibility, some types of arresters have been equipped with a so-called "drop out" feature. This is usually incorporated in the bottom of the ligthning arrester case and the ground lead is attached to it. In case of failure of an arrester, the resultant heat and pressure causes fracture in a weak porcelain section at the ground end of the arrester, permitting the ground lead to drop out, thereby clearing the arrester from the circuit. Various other expedients have been resorted to for clearing lightning arresters from the line upon failure of the arrester to interrupt the power follow current on return of the line voltage to normal. These previous expedients have included utilization of a fusible bottom plate or use of a ceramic ring having a center portion adapted to crack upon continued application of heat.

The present invention is an entirely new drop out device or circuit interrupter utilizing a control element which generates sufficient force to separate the arrester connection in case of failure of the arrester. The interrupter disclosed herein utilizes a length of small electrical conductor or fine wire in close proximity to a material which evolves gas when exposed to sufficiently high temperature. This electrical conductor provides sufficient inductance to cause surge current to be transferred to a parallel spark gap and passed to ground. This electrical conductor or fine wire has sufficient capacity to carry regular power follow current without damage. In the event of arrester failure and continued flow of fault current the bottom section of the drop out device is fractured and the connection to ground is completely severed. Upon failure of the arrester, the electrical conductor or fine wire vaporizes and sufficient force is generated to fracture the bottom section and associated ground connection and to completely remove the damaged arrester from the line.

One of the major advantages of this device is that it permits a stud bottom connection to be made and provides a unique drop out disconnect device without any auxiliary devices. This drop out device is of very simple and economical construction, yet the drop out device operates on a wide range of expected fault currents when the arrester has been damaged. The simplicity and lack of possibilities for anything to render this drop out device inoperative are among its further advantages.

The primary object of the invention is to provide an improved circuit interrupter for a protective device or lightning arrester which includes positive means for separation of the ground terminal of the lightning arrester.

Another object of the invention is to provide an improved circuit interrupter for a lightning arrester which gives visual indication of the operation of the protective device.

A further and more specific object of the invention is to provide an improved circuit interrupter for a lightning arrester which utilizes an inductance coil and a spark gap in parallel to disconnect the lightning arrester from the line only upon failure of the lightning arrester, and in which controlled fracture of the bottom portion is provided.

Other objects and advantages of the invention will be apparent from the following detailed description taken in connection with the accompanying drawings in which.

Although the circuit interrupter of this invention is shown for use with a valve type lightning arrester, it will be understod, of course, that it may be employed with other and different excess voltage protective devices.

Figure 1:
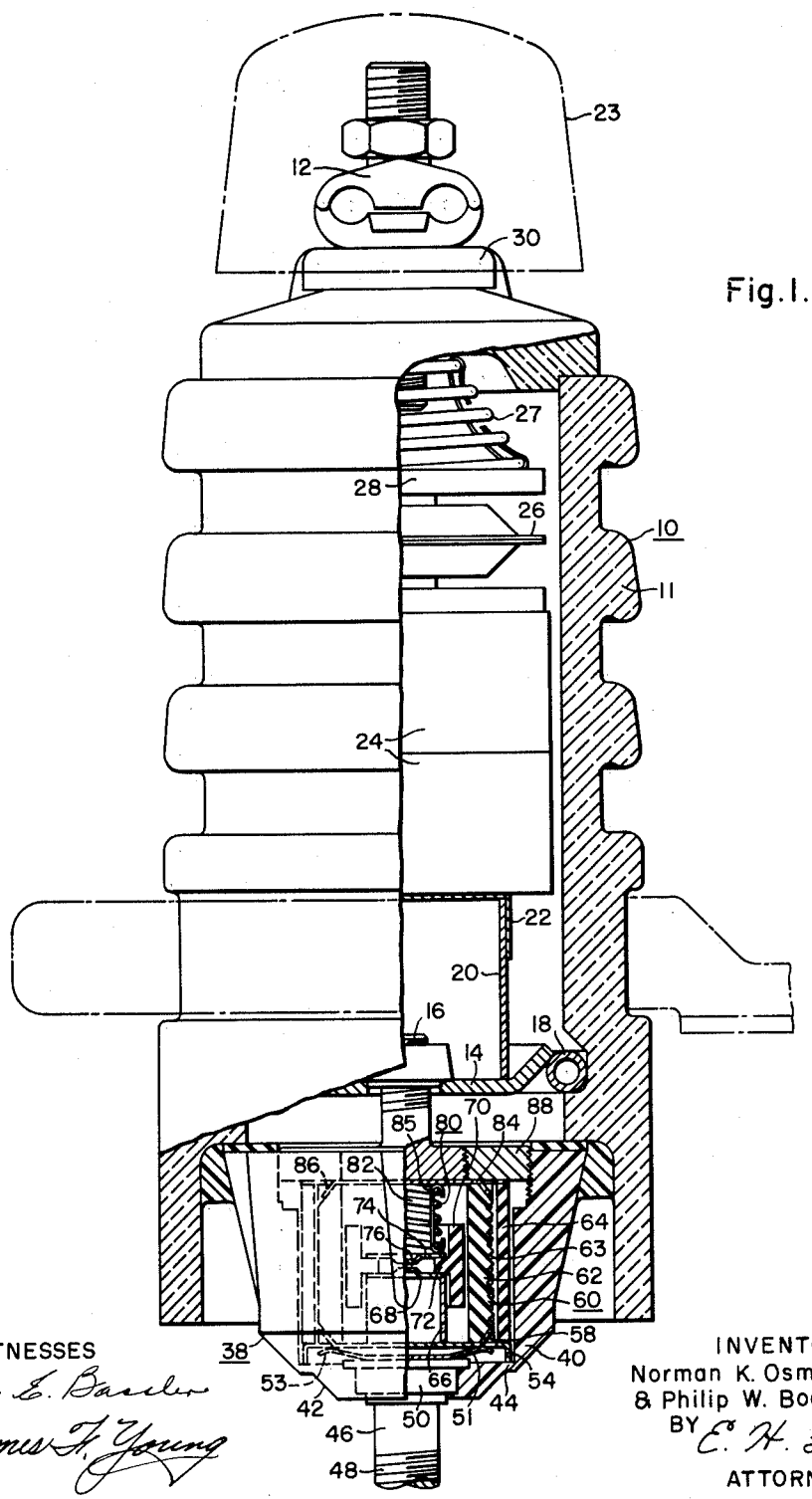
FIGURE 1 is a side elevational view of an arrester incorporating the interrupter of this invention, partly in section.

In FIGURE 1 is shown a valve type lightning arrester 10 which includes a housing 11 of porcelain, or any other suitable dielectric material, having a line terminal 12 entering at the top. The porcelain housing 11 is hollow containing at its lower end a retaining and contact plate 14 forming an end closure for the housing which is held in position by a spring retainer 18. A stud 16 is disposed centrally on said sealing plate 14. Disposed over this bottom retaining and contact plate 14 is a spacer 20 and a contact cup 22. Disposed over the contact cup 22 are a plurality of non-linear resistance blocks 24. The blocks may be of any suitable type, but preferably consist of granular silicon carbide molded with a suitable binder and either baked or fired to provide power blocks having the desired valve characteristics. Any suitable number of blocks may be used.

A plurality of spark gap devices 26 are disposed in alignment and in electrical contact with the blocks 24. Any suitable spring 27, as for example a helical spring as shown may be provided at the top of the housing to insure intimate contact between the elements of the arrester. The spring 27 bears against a metal electrode plate 28 and a metal cap 30 integral with the terminal stud at the top of the housing 11. A molded terminal cap 23 may be employed to cover the line terminal 12 if desired. Thus, we show a typical form of a valve type lightning arrester incorporating a practical embodiment of the invention. Secured to the stud 16 on contact plate 14 is a circuit interrupter 38 which constitutes the subject matter of this invention.

The circuit interrupter of this invention is essentially a drop out type circuit interrupter. It comprises a substantially cup-shaped housing 40. The housing may be manufactured of any suitable material. Preferably, a translucent plastic material as shown in this embodiment is employed. Any transparent or translucent acrylic or other plastic can be employed. Examples of these are thermoplastic and thermosetting materials such as polystyrene, polycarbonate and copolymers of these, and among the thermosetting materials polyester or epoxies may be employed. When the drop out device operates to separate the ground connection of the damage arrester from the line the case becomes blackened and discolored in addition to the fracturing of the bottom section and the dropping off of the ground lead connection. This change in color and appearance upon operation is an additional advantage as an indication of operation.

As can be clearly seen in FIG. 1 an annular bottom portion 42 of the cup is secured to the side walls by a thin annular portion at 44. The housing is so shaped and so designed that the thin annular portion is rapidly and easily fractured by a predetermined force. The bottom portion 42 includes a bottom terminal stud 46 having a threaded lower end 48, and an enlarged head 50. The stud 46 is molded into the housing 40. A contact 51 lies on the end portion 42 within the housing 40 in contact with the terminal stud 46 adjacent the enlarged head 50. As shown, the contact 51 may be a copper disc or a disc of other suitable conducting material having a plurality of radially extending arms 53 integral therewith. Overlying the contact 51 is a pressure plate 52 having an annular flange 54 extending downwardly and enclosing the contact 51. The diameter of the annular flange 54 on the pressure plate 52 is of such dimension as to lie closely adjacent the thin walled annular portion 44 of the housing. The function of the flange is to concentrate and distribute the force uniformly about the thin walled portion 44.

A pair of projections 58 are struck upward from the pressure plate 52. These projections 58 receive and position a coil assembly 60 comprising a cylindrical spool 62 of fiber or other suitable dielectric material which evolves gas when subjected to high temperature. On the outer surface of the cylindrical spool 62 are a plurality of turns of relatively fine wire or other suitable electrical conductor, preferably copper, but it may be of any suitable conducting material forming a coil 63. Each end of the wire is secured respectively to an end of the spool 62. The lower end of the wire is located in contact with pressure plate 52. Concentrically disposed with respect to the cylindrical coil assembly 60 is an outer fiber cylindrical tube 64 which lies intermediate the side walls of the cup and the inner spool 62. The outer cylindrical tube 64 may be of fiber or any other suitable material which evolves gas when exposed to sufficiently high temperatures.

Disposed concentrically within the coil assembly 60 and centrally thereof is a spacer 66 of brass or any suitable conducting material. Disposed on the upper end of the spacer 66 is an electrode 68. Also concentric with the spool assembly 60 is an insulating tube 70 having a centrally disposed inwardly extending annular flange 72. An upper electrode 74 is disposed within the tube 70 and rests upon the annular flange 72. The lower side of the annular flange 72 rests upon the lower electrode 68. Thereby, a pair of electrodes are disposed concentric with the coil assembly 60 and are spaced apart to form a spark gap 76 between them. A spring assembly 80 is disposed with one end adjacent the upper electrode 74. The spring assembly comprises a coil spring 82 and a short circuiting strip 85. The short circuiting strip 85 obviates the inductance effect of the coil spring 82. A retainer plate 84 in the form of a metallic disc of conducting material is disposed upon the upper end of the cylinder 64. The retainer plate 84 is of a diameter substantially equal to the outer cylinder 64. The retainer plate 84 has a pair of downwardly facing projections 86 to locate and retain in position the spool assembly 60 at its upper end.

The cup or housing 40 has an internally threaded portion of enlarged diameter adjacent its upper end. Received in this threaded portion is a threaded cap 88. The threaded cap 88 is formed of a conducting metal ring and the inner diameter of the ring is internally threaded to receive the threaded stud 16 on the contact plate 14 of the lightning arrester 10. The retaining cap 88 is disposed above the retaining plate 84 and when it is threaded within the internal thread of the molded housing 40 it forces the retainer plate downward against the pressure of the spring assembly 80. This retains the drop out device in assembled position. The cap 88 also serves as a connecting means for the drop out device. It provides a means for connecting the drop out device to the excess voltage protective device, which is the lightning arrester 10 in the embodiment illustrated. Retaining plate 84 makes contact with the upper end of the inductance coil 63, and with the upper electrode 70 of the gap 76 through the spring assembly 80.

It can be seen that a circuit interrupter or drop out device has been provided which includes an inductance coil 63 of fine wire or small electrical conductors, and a spark gap 76, connected in parallel and interposed in series with an excess voltage protective device or lightning arrester connected between a line and ground. The electrical conductor or wire is of such diameter that it is rapidly vaporizable when exposed to normal line frequency current for a predetermined length of time. When exposed to surge current the inductance of the coil 63 is such as to effect sparkover of the gap 76 so that upon the occurrence of a surge the drop out device passes the surge current to ground through the gap.

However, since the vaporizable coil is situated adjacent a pair of cylinders which readily evolve gas when exposed to sufficiently high temperature, on passage of continued normal line frequency current, the high temperature of the vaporized electrical conductor or wire causes the cylindrical fiber tubes to evolve gas thereby exerting additional force on the pressure plate 52 causing it to exert force at the weakened or thin annular wall portion 44 of the housing, thereby separating the bottom portion 42 of the device from the housing 40 and disconnecting the ground terminal stud 48 from the device.

It will of course be understood that the coil may be designed, if desired, to cause the coil to vaporize on other frequencies or at predetermined values of current.

The gap 76 is spring loaded by the spring assembly 80. Therefore upon occurrence of extremely high surge currents, the spring 82 permits the gap to move and then return to normal operating position without damage due to these high surge currents. The drop out gap must be capable of withstanding without damage a number of high current surges and maintain the same sparkover.

The spring loaded gap has also other advantages for the operation of the interrupter. For example, the entire drop out unit is assembled and put together with a spring pushing on the gap and the bottom portion 42 of the housing. This biases the entire drop out unit and places a residual force on the bottom section. The spring insures that the actual drop out operation on fault current is sharp and complete. The force built up by the generation of the gases during the fault current operation is added to the residual force from the spring and causes a definite break point with respect to the length of time of operation. The spring is shunted with conducting member 85 so that the inductance of the spring is not added to the coil. The control of inductance is entirely a function of the wound electrical conductor section of the drop out device. The spring loaded gap for the drop out device has good high current surge withstand characteristics. It will operate without damage and maintain itself throughout the life of the arrester. It has a more consistent actual time of drop out operation over the entire range of fault current because of the additional pressure of the spring load.

The pressure plate 52 rests directly on the bottom of the housing and as soon as any force develops it is concentrated on a restricted contact area defined by the flange 54 of the pressure plate 52. As force is built up in the operation of the drop out unit, it is transmitted directly to the proper location at the bottom of the outer housing 40. The bottom portion 42 breaks away clearly over the entire circumference of the bottom. There is no possibility that either the concentrated knock out pressure plate or any of the internal parts will hang up or only partially come out because the entire section breaks loose. One difficulty in all drop out devices is that if the bottom break is not complete and entirely continuous around the entire area the device does not function properly. The internal mechanism may operate and perform in a normal manner, yet the connection is not broken until the bottom terminal is electrically separated from the device. At low currents, the pressure builds up slowly and in these cases the concentrated pressure plate 52 assures uniform separation even at very low currents. In the other situation, of relatively high fault currents pressure is built up very rapidly and in order to keep from fracturing the case itself the bottom connection is broken much more rapidly with this concentrated knockout plate. This plate 52 at the bottom of the drop out device helps to confine the force to an area where it will do the job of terminal separation the fastest with the most certainty under all expected ranges of fault current.

Figure 5:
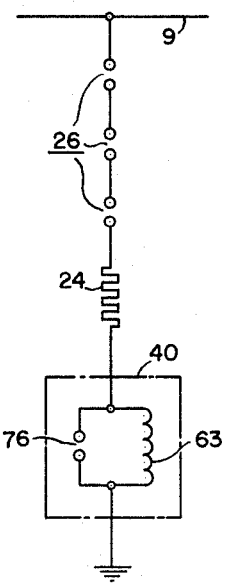
FIGURE 5 is a schematic diagram of a lightning arrester employing the invention.

FIGURE 5 shows schematically the circuit diagram of this invention. The numeral 9 represents an alternating current power line, the gap assembly is represented at 26 and is shown to be in series with the non-linear resistance or valve blocks 24. Induction coil 63 is shown in parallel with the gap 76. The dotted line 40 represents the interrupter housing. It can be seen that the circuit interrupter of this device is connected to the line through the excess voltage protective device or lightning arrester comprising a plurality of gaps and non-linear resistance blocks in series. The gap 76 and coil 63 are connected in parallel and the excess voltage protective device or lightning arrester is connected to ground through the circuit interrupter of this invention.

In operation, the gap assembly 26 of the lightning arrester is set to have a breakdown voltage which is higher than the highest contemplated values of the normal power frequency line voltage but will have a low and consistent sparkover on the steep wave front of an excess voltage surge. The non-linear resistance blocks are designed to have a critical change in resistance, from a relatively high resistance on low surge current to a relatively low resistance on high surge current. When the excess voltage condition has been dissipated, the gaps recover and restore themselves to insulators capable of holding off normal line voltage. If a condition should arise where the blocks 24 fail then there will be a short circuit to ground on the system. Normally, of course, the lightning arrester is not conductive and is rendered conductive only upon a predetermined abnormally high voltage, such as a lightning surge impressed thereupon. Upon the discontinuance of the high voltage condition, the arrester again becomes non-conductive. In the event that the arrester is damaged, the arc would not be extinguished upon the passage of the surge condition and a heavy fault current would flow though the arrester to ground.

Under surge conditions, the coil 63 offers high impedance to the surge current since the steep wave front of a surge has the effect of a high frequency current. Therefore, sufficient voltage appears across the gap 76 to spark it over so that the surge current flows to ground through the gap. However, should the blocks 24 fail, the power follow current will not be interrupted but will instead maintain an arc across the gaps and through the blocks 24. Once such an arc has been established power follow current will change to full unlimited fault current. In this case the current is of normal line frequency and will flow through the coil 63. The coil being a small electrical conductor or wire will vaporize causing gas pressure to build up within the housing 40. Force is thus applied to plate 52 causing fracture of the bottom portion 42 of housing 40 and consequent separation of the bottom portion at the thin walled annular periphery 44 of the housing, thereby causing the end portion 42 to separate from the housing together with the terminal stud 46, disconnecting the excess voltage protective or lightning arrester device from the line. All of this transpires very rapidly as soon as full fault current flows.

Figure 2:
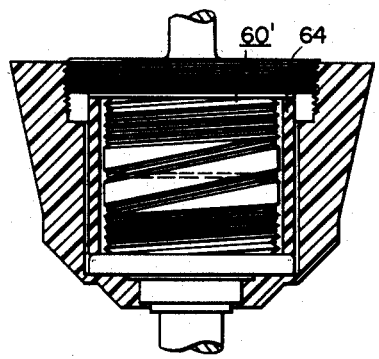
FIGURE 2 is an end longitudinal sectional view of a portion of the drop out device showing a modified coil construction.

In FIGURE 2 is shown a coil assembly 60′ of an alternative embodiment. The structure of the drop out device itself is the same as described above, the only difference being in the coil assembly 60′. In the alternative embodiment shown in FIG. 2, the turns at each end of the coil assembly 60′ are wound closer together than at the center. With this modification protection for a wider range of currents is available. The same basic elements are utilized with the modification being in the inner coil assembly only. The required length of electrical conductor or wire is used but it is stretched out in the center section. The two ends are made as required for the proper value of inductance. By stretching out the electrical conductor or wire at the center section, the initiation of vaporization is controlled in this section. In the embodiment shown in FIG. 1, there is a possiblity that at very low currents the wire might tend to burn rather than vaporize. This would produce gas which would build up pressure slowly and open the coil connection rather than vaporizing the wire and quickly knocking out the bottom weakened section. The low current drop out protective range of this device is extended downward in this modification.

Figure 3:
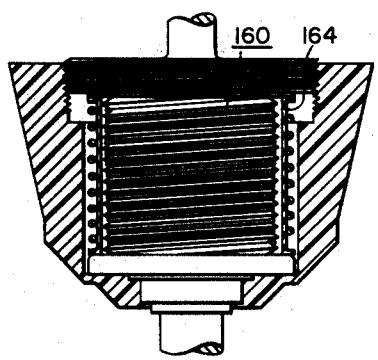
FIGURE 3 is a longitudinal sectional view of the invention showing another modification of the coil of this invention.

Another modification of the invention is shown in FIG. 3. In the modification shown in FIG. 3, an outer fiber coil 164 is shown wound with larger electrical conductor, or heavy diameter wire, while the inner coil 160 employs a small electrical conductor or wire. The outer coil 164 corresponds to the outer fiber cylinder 64 in FIG. 2 while the inner coil 160 corresponds to coil assembly 60 in FIG. 1, as to their disposition within the drop out device. In other respects the structure of the device is identical with the embodiment shown in FIG. 1. The larger electrical conductor or heavy diameter wire coil 164 and the small electrical conductor or wire coil on the inner coil 160 are electrically connected in series but disposed physically in parallel relationship. This modification employing a folded coil can enable the length of the drop out device to be decreased in size by one-half. This may be of significance in manufacturing a small drop out unit. The drop out device is constructed by utilizing a top contact makes contact with the coil of relatively large electrical conductor or heavy diameter wire wound on the outer coil form. This contains sufficient inductance that on surge current the parallel gap is sparked and allows a surge to pass to ground. Now sufficient inductance can be provided in the coil unit without causing the small electrical conductor or wire coil 160 to be of such a length that it would not always vaporize consistently on all levels of fault currents. The inside fibrous surface of the outer coil 164 forms the outside fibrous surface area for the inner fibrous spool. This is wound with small electrical conductor or wire over the entire length. The electrical conductor or wire comes into the top of the inner fibrous spool from the outer coil and is isolated from the top electrical contact. The small electrical conductor or wire is wound on a coil 160 and makes contact with the bottom electrodes. The drop out action with the shorter length coil can be controlled to operate over the desired fault current range.

Figure 4:
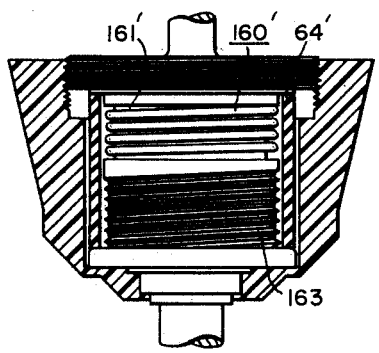
FIGURE 4 is a longitudinal sectional view similar to FIGURE 3 showing still another modification of the coil employed in this invention; said

Another modification of the drop out device is shown in FIG. 4. This modification is quite similar to the modification disclosed in FIG. 3. In this case, however, the outer fiber cylinder 64' is identical to the cylindrical fiber coil 64 in the embodiment shown in FIG. 1. However the inner fiber coil is modified. The inner threaded coil 160' includes an upper section wound with large electrical conductor or heavy diameter wire and a lower section having a coil wound with small electrical conductor or wire. This is similar in principle to the modification shown in FIG. 3 but the coils are placed physically in series as well as electrically. Again the large electrical conductor or wire wound coil on the upper portion 161' would be used to control the inductance in the fibrous coil portion 163 while the small electrical conductor or wire would control the fracture of the bottom section. Both of these components could be made smaller than any of the previous models. The modifications shown in FIGS. 3 and 4 provide independent control of the inductance while utilizing a constant length of small electrical conductor or wire with resulting uniform drop out action over the entire range of fault currents.

It should now be apparent that a circuit interrupter for excess voltage protective devices or lightning arresters has been provided which has many advantages. The interrupter is operable over the entire range for which a protective device is intended. It is simple and compact and results in positive separation or opening of the circuit. Uniform and consistent results can be expected. While certain specific embodiments of the invention have been shown and described for the purpose of illustration, it will be apparent that various other embodiments are possible within the scope of the invention.

We claim as our invention:

1. A circuit interrupter adapted to be connected in series with an excess voltage protective device for use in alternating current power lines, said interrupter comprising a housing having an end portion carrying a connecting terminal, said end portion secured to said housing by an annular portion of reduced thickness, coil means disposed within said housing adapted to be connected in series with said device, a pair of electrodes spaced apart to form a spark gap between them connected across said coil means, means for evolving gas when exposed to sufficiently high temperature disposed in close proximity to said coil, said coil being rapidly vaporizable and capable of generating sufficient heat to activate said gas evolving means when subjected to normal line frequency current, said coil means having an impedance, when subjected to surge current, sufficient to produce a voltage across said gap of a value to cause said gap to sparkover, whereby separation of said end portion from said housing at said annular portion is effected by internal gas pressure when said coil is subjected to normal line frequency current for a predetermined length of time.

2. A circuit interrupter adapted to be connected in series with an excess voltage protective device for use in alternating current power lines, said interrupter comprising a housing having an end portion carrying a connecting terminal, said end portion secured to said housing by an annular portion of reduced thickness, means contained in said housing bearing upon said annular portion for concentrating internal pressure uniformly about said annular portion, coil means disposed within said housing adapted to be connected in series with said device, a pair of electrodes spaced apart to form a spark gap between them connected across said coil means, means for evolving gas when exposed to sufficiently high temperature disposed in close proximity to said coil, said coil being rapidly vaporizable and capable of generating sufficient heat to activate said gas evolving means when subjected to normal line frequency current, said coil means having an impedance, when subjected to surge current, sufficient to produce a voltage across said gap of a value to cause said gap to sparkover, whereby separation of said end portion from said housing is effected by internal gas pressure when said coil is subjected to normal line frequency current for a predetermined length of time.

3. A circuit interrupter adapted to be connected in series with an excess voltage protective device for use in alternating current power lines, said interrupter comprising a sealed housing having an end portion carrying a connecting terminal, means to conduct surge current through said interrupter, an inductance coil connected across said surge current conducting means, said coil being rapidly vaporizable when subject to power line frequency current and having fewer turns per unit length at its central portion than at its end portions, an element capable of evolving gas when subjected to high temperature disposed in close proximity to said coil means, whereby sufficient force is developed within said housing by the vapor from said coil and gas evolved by said gas evolving element from the heat of the coil, when carrying power line frequency current, to separate said end portion and said terminal from said housing.

4. A circuit interrupter adapted to be connected in series with an excess voltage protective device for use in alternating current power lines, said interrupter comprising a housing having an end portion carrying a connecting terminal, said end portion secured to said housing by an annular portion of reduced thickness, coil means disposed within said housing adapted to be connected in series with said device, a pair of electrodes, means for spacing said electrodes apart to form a spark gap between them, said spark gap connected across said coil means, said spacing means and said electrode forming an enclosed gap space, spring biasing means for biasing said electrodes against said spacing means, means for evolving gas when exposed to sufficiently high temperature disposed in close proximity to said coil, said coil being rapidly vaporizable and capable of generating sufficient heat to activate said gas evolving means when subjected to normal line frequency current for a predetermined length of time, said coil means having an impedance when subjected to surge current sufficient to produce a voltage across said gap of a value to cause said gap to spark over, whereby separation of said end portion from said housing is effected when said coil is subjected to normal line frequency for a predetermined length of time.

5. A circuit interrupter adapted to be connected in series with an excess voltage protective device for use in alternating current power lines, said interrupter comprising a housing having an end portion carrying a connecting terminal, means to conduct surge current through said interrupter comprising a spark gap, a pair of coils connected in series across said surge current conducting means, one of said coils being of substantially larger wire relative to the other of said coils, said one coil having sufficient inductance to effect sparkover of said gap when subjected to surge current, said other coil being rapidly vaporizable when subjected to power line frequency current for a predetermined length of time, an element capable of evolving gas when subjected to high temperature disposed in close proximity to said other coil, whereby sufficient force is developed within said housing by the vapor from said other coil and the gas evolved by said gas evolving element from the heat of said other coil, when carrying power line frequency current, to separate said end portion and said terminal from said housing.

6. A circuit interrupter adapted to be connected in series with an excess voltage protective device for use in alternating current power lines, said interrupter comprising a housing having an end portion carrying a connecting terminal, means to conduct surge current through said interrupter comprising a spark gap, a pair of coils connected in series across said surge current conducting means, said coils being disposed concentrically with respect to each other, one of said coils being of substantially larger diameter wire relative to the other of said coils, said one coil having sufficient inductance to effect sparkover of said gap when subjected to surge current, said other coil being rapidly vaporizable when subjected to power line frequency current for a predetermined length of time, an element capable of evolving gas when subjected to high temperature disposed in close proximity to said other coil, whereby sufficient force is developed within said housing by the vapor from said other coil and the gas evolved by said gas evolving element from the heat of said other coil, when carrying power line frequency current, to separate said end portion and said terminal from said housing.

7. A circuit interrupter adapted to be connected in series with a lightning arrester, said interrupter comprising a closed housing having an end portion carrying a terminal member, said end portion being separable from the housing in response to internal pressure, a pair of spaced electrodes within the housing forming a spark gap between them, an inductance coil connected across said spark gap, said coil having high enough impedance to surge current to cause said spark gap to spark over and at least a portion of said coil being rapidly vaporizable when subjected to normal frequency current, and means closely adjacent said coil for evolving gas when heated by vaporization of the coil, whereby said end portion of the housing is separated therefrom by internal gas pressure upon vaporization of the coil.

8. A circuit interrupter adapted to be connected in series with a lightning arrester, said interrupter comprising a closed housing having an end portion carrying a terminal member, said end portion being separable from the housing in response to internal pressure, a pair of spaced electrodes within the housing forming a spark gap between them, a cylindrical member of insulating material capable of evolving gas when heated surrounding said spark gap, an inductance coil wound on said cylindrical member and connected across the spark gap, said coil having high enough impedance to surge current to cause said spark gap to spark over and at least a portion of said coil being rapidly vaporizable when subjected to normal frequency current, whereby said end portion of the housing is separated therefrom by internal gas pressure upon heating of the cylindrical member by vaporization of the coil.

9. A circuit interrupter adapted to be connected in series with a lightning arrester, said interrupter comprising a closed housing having an integral end portion carrying a terminal member, said end portion being joined to the housing by a weakened section, means in the housing for concentrating internal pressure on said weakened section, a pair of spaced electrodes within the housing forming a spark gap between them, an inductance coil connected across said spark gap, said coil having high enough impedance to surge current to cause said spark gap to spark over and at least a portion of said coil being rapidly vaporizable when subjected to normal frequency current, and means closely adjacent said coil for evolving gas when heated by vaporization of the coil, whereby said end portion of the housing is separated therefrom by internal gas pressure upon vaporization of the coil.

10. A circuit interrupter adapted to be connected in series with a lightning arrester, said interrupter comprising a closed housing having an integral end portion carrying a terminal member, said end portion being joined to the housing by an annular section of reduced thickness, a pressure plate in the housing having a peripheral flange bearing against said annular section to concentrate internal pressure in the housing thereon to effect separation of the end portion from the housing in response to internal pressure, a pair of spaced electrodes within the housing forming a spark gap between them, an inductance coil connected across said spark gap, said coil having high enough impedance to surge current to cause said spark gap to spark over and at least a portion of said coil being rapidly vaporizable when subjected to normal frequency current, and means closely adjacent said coil for evolving gas when heated by vaporization of the coil, whereby said end portion of the housing is separated therefrom by internal gas pressure upon vaporization of the coil.

11. A circuit interrupter adapted to be connected in series with a lightning arrester, said interrupter comprising a closed housing having an end portion carrying a terminal member, said end portion being separable from the housing in response to internal pressure, a pair of electrodes in the housing, spacing means between the electrodes spacing them apart to form a spark gap between them, spring means in the housing yieldably holding the electrodes against the spacing means, an inductance coil connected across said spark gap, said coil having high enough impedance to surge current to cause said spark gap to spark over and at least a portion of said coil being rapidly vaporizable when subjected to normal frequency current, and means closely adjacent said coil for evolving gas when heated by vaporization of the coil, whereby said end portion of the housing is separated therefrom by internal gas pressure upon vaporization of the coil.

References Cited in the file of this patent

UNITED STATES PATENTS

| | | |
|---|---|---|
| 2,158,859 | Horikoshi | May 16, 1939 |
| 2,305,394 | Smith | Dec. 15, 1942 |
| 2,305,436 | McMorris | Dec. 15, 1942 |
| 2,315,320 | Earle | Mar. 30, 1943 |
| 2,777,095 | Stoelting | Jan. 8, 1957 |